US008060304B2

(12) United States Patent
Nielsen et al.

(10) Patent No.: US 8,060,304 B2

(45) Date of Patent: Nov. 15, 2011

(54) MARKING SYSTEM AND METHOD

(75) Inventors: Steven Nielsen, North Palm Beach, FL (US); Curtis Chambers, Palm Beach Gardens, FL (US); Jeffrey Farr, Jupiter, FL (US); Rene Vazquez, Herndon, VA (US)

(73) Assignee: Certusview Technologies, LLC, Palm Beach Gardens, FL (US)

( * ) Notice: Subject to any disclaimer, the term of this patent is extended or adjusted under 35 U.S.C. 154(b) by 952 days.

(21) Appl. No.: 11/696,606

(22) Filed: Apr. 4, 2007

(65) Prior Publication Data

US 2008/0245299 A1 Oct. 9, 2008

(51) Int. Cl.
*G01C 21/00* (2006.01)

(52) U.S. Cl. ........................................ 701/213; 340/988

(58) Field of Classification Search .................. 701/213; 342/357.15; 340/988

See application file for complete search history.

(56) References Cited

U.S. PATENT DOCUMENTS

| | | | |
|---|---|---|---|
| 3,871,557 | A | 3/1975 | Smrt |
| 3,972,038 | A | 7/1976 | Fletcher et al. |
| 3,974,491 | A | 8/1976 | Sipe |
| 3,988,922 | A | 11/1976 | Clark et al. |
| 4,258,320 | A | 3/1981 | Schonstedt |
| 4,387,340 | A | 6/1983 | Peterman |
| 4,388,592 | A | 6/1983 | Schonstedt |
| 4,520,317 | A | 5/1985 | Peterman |
| 4,536,710 | A | 8/1985 | Dunham |
| 4,539,522 | A | 9/1985 | Schonstedt |
| 4,590,425 | A | 5/1986 | Schonstedt |
| 4,639,674 | A | 1/1987 | Rippingale |
| 4,712,094 | A | 12/1987 | Bolson, Sr. |
| 4,747,207 | A | 5/1988 | Schonstedt et al. |
| 4,803,773 | A | 2/1989 | Schonstedt |
| 4,818,944 | A | 4/1989 | Rippingale |
| 4,839,623 | A | 6/1989 | Schonstedt et al. |
| 4,839,624 | A | 6/1989 | Schonstedt |
| 4,873,533 | A | 10/1989 | Oike |
| 5,001,430 | A | 3/1991 | Peterman et al. |
| 5,006,806 | A | 4/1991 | Rippingale et al. |
| 5,014,008 | A | 5/1991 | Flowerdew |
| 5,017,873 | A | 5/1991 | Rippingale et al. |
| 5,025,150 | A | 6/1991 | Oldham et al. |
| 5,043,666 | A | 8/1991 | Tavernetti et al. |
| 5,045,368 | A | 9/1991 | Cosman et al. |
| 5,065,098 | A | 11/1991 | Salsman et al. |
| 5,093,622 | A | 3/1992 | Balkman |

(Continued)

FOREIGN PATENT DOCUMENTS

CH 695087 A5 12/2005

(Continued)

OTHER PUBLICATIONS

Co-pending U.S. Appl. No. 12/539,497, filed Aug. 11, 2009.

(Continued)

*Primary Examiner* — Mark Hellner

(74) *Attorney, Agent, or Firm* — Foley & Lardner LLP; Joseph Teja, Jr.

(57) ABSTRACT

A marking system may hold a container from which markers are dispensed and identify a marker characteristic regarding the markers in the container. The marking system may also receive activation of a trigger, dispense a marker from the container when the trigger is activated, and store the marker characteristic and time data when the trigger is activated.

43 Claims, 8 Drawing Sheets

100
160 Triggering System
170 Tag Reader
150 Marker Dispenser
140 Processor
110 Communication System
130 Local Memory
120 Interface

U.S. PATENT DOCUMENTS 5,097,211 A 3/1992 Schonstedt
5,114,517 A 5/1992 Rippingale et al.
5,122,750 A 6/1992 Rippingale et al.
5,136,245 A 8/1992 Schonstedt
5,138,761 A 8/1992 Schonstedt
5,173,139 A 12/1992 Rippingale et al.
5,206,065 A 4/1993 Rippingale et al.
5,214,757 A 5/1993 Mauney et al.
5,231,355 A 7/1993 Rider et al.
5,239,290 A 8/1993 Schonstedt
5,260,659 A 11/1993 Flowerdew et al.
5,264,795 A 11/1993 Rider
5,361,029 A 11/1994 Rider et al.
5,365,163 A 11/1994 Satterwhite et al.
5,373,298 A 12/1994 Karouby
5,430,379 A 7/1995 Parkinson et al.
5,444,364 A 8/1995 Satterwhite et al.
5,471,143 A 11/1995 Doany
5,519,329 A 5/1996 Satterwhite
5,530,357 A 6/1996 Cosman et al.
5,543,931 A 8/1996 Lee et al.
5,568,162 A 10/1996 Samsel et al.
5,576,973 A 11/1996 Haddy
5,621,325 A 4/1997 Draper et al.
5,629,626 A 5/1997 Russell et al.
5,644,237 A 7/1997 Eslambolchi et al.
5,739,785 A 4/1998 Allison et al.
5,751,289 A 5/1998 Myers
5,764,127 A 6/1998 Hore et al.
5,769,370 A 6/1998 Ashjaee
5,828,219 A 10/1998 Hanlon et al.
5,916,300 A 6/1999 Kirk et al.
5,917,325 A 6/1999 Smith
5,920,194 A 7/1999 Lewis et al.
5,955,667 A 9/1999 Fyfe
6,026,135 A 2/2000 McFee et al.
6,031,454 A 2/2000 Lovejoy et al.
6,032,530 A 3/2000 Hock
6,037,010 A 3/2000 Kahmann et al.
6,053,260 A 4/2000 Boon
6,061,632 A 5/2000 Dreier
6,064,940 A 5/2000 Rodgers
6,074,693 A * 6/2000 Manning ........................ 427/137
6,107,801 A 8/2000 Hopwood
6,127,827 A 10/2000 Lewis
6,130,539 A 10/2000 Polak
6,138,906 A 10/2000 DeMayo
6,140,819 A 10/2000 Peterman et al.
6,169,958 B1 1/2001 Nagasamy et al.
6,188,777 B1 2/2001 Darrell et al.
6,206,282 B1 3/2001 Hayes, Sr. et al.
6,234,218 B1 5/2001 Boers
6,268,731 B1 7/2001 Hopwood et al.
6,292,108 B1 9/2001 Straser et al.
6,297,736 B1 10/2001 Lewis et al.
6,299,934 B1 10/2001 Manning
6,308,565 B1 10/2001 French et al.
RE37,574 E * 3/2002 Rawlins ............................ 702/2
6,356,082 B1 3/2002 Alkire et al.
6,363,320 B1 3/2002 Chou
6,375,038 B1 4/2002 Daansen et al.
6,378,220 B1 4/2002 Baioff et al.
6,390,336 B1 5/2002 Orozco
6,407,550 B1 6/2002 Parakulam et al.
6,411,094 B1 6/2002 Gard et al.
6,437,708 B1 8/2002 Brouwer
6,438,239 B1 8/2002 Kuechen
6,459,266 B1 10/2002 Fling
6,476,708 B1 11/2002 Johnson
6,490,524 B1 12/2002 White et al.
6,512,478 B1 * 1/2003 Chien ...................... 342/357.09
6,549,011 B2 4/2003 Flatt
6,552,548 B1 4/2003 Lewis et al.
6,585,133 B1 7/2003 Brouwer
6,600,420 B2 7/2003 Goff et al.
6,617,856 B1 9/2003 Royle et al.
6,633,163 B2 10/2003 Fling
6,650,798 B2 11/2003 Russell et al.
6,674,276 B2 1/2004 Morgan et al.
6,710,741 B2 3/2004 Tucker
6,717,392 B2 4/2004 Pearson
6,723,375 B2 4/2004 Zeck et al.
6,728,662 B2 4/2004 Frost et al.
6,751,554 B1 6/2004 Asher et al.
6,777,923 B2 8/2004 Pearson
6,778,128 B2 8/2004 Tucker et al.
6,798,379 B2 9/2004 Tucker et al.
6,799,116 B2 9/2004 Robbins
6,815,953 B1 11/2004 Bigelow
6,819,109 B2 11/2004 Sowers et al.
6,825,775 B2 11/2004 Fling et al.
6,825,793 B2 11/2004 Taylor, Jr. et al.
6,833,811 B2 12/2004 Zeitfuss et al.
6,836,231 B2 12/2004 Pearson
6,845,171 B2 1/2005 Shum et al.
6,850,161 B1 2/2005 Elliott et al.
6,850,843 B2 2/2005 Smith et al.
6,853,303 B2 2/2005 Chen et al.
6,865,484 B2 3/2005 Miyasaka et al.
6,898,550 B1 5/2005 Blackadar et al.
6,904,361 B1 6/2005 Tallman et al.
6,947,028 B2 9/2005 Shkolnikov
6,954,071 B2 10/2005 Flatt et al.
6,956,524 B2 10/2005 Tucker et al.
6,958,690 B1 10/2005 Asher et al.
6,968,296 B2 11/2005 Royle
6,975,942 B2 12/2005 Young et al.
6,977,508 B2 12/2005 Pearson et al.
6,992,584 B2 1/2006 Dooley et al.
6,993,088 B2 1/2006 Fling et al.
7,009,519 B2 3/2006 Leonard et al.
7,038,454 B2 5/2006 Gard et al.
7,042,358 B2 5/2006 Moore
7,053,789 B2 5/2006 Fling et al.
7,057,383 B2 6/2006 Schlapp et al.
7,062,414 B2 6/2006 Waite et al.
7,079,591 B2 7/2006 Fling et al.
7,091,872 B1 8/2006 Bigelow et al.
7,113,124 B2 9/2006 Waite
7,116,244 B2 10/2006 Fling et al.
7,120,564 B2 10/2006 Pacey
7,235,980 B2 6/2007 Pearson et al.
7,285,958 B2 10/2007 Overby et al.
7,304,480 B1 12/2007 Pearson
7,310,584 B2 12/2007 Royle
7,319,387 B2 1/2008 Willson et al.
7,331,340 B2 2/2008 Barney
7,336,078 B1 2/2008 Merewether et al.
7,339,379 B2 3/2008 Thompson et al.
7,342,537 B2 3/2008 Pearson et al.
7,356,421 B2 4/2008 Gudmundsson et al.
7,358,738 B2 4/2008 Overby et al.
7,372,247 B1 5/2008 Giusti et al.
7,372,276 B2 5/2008 Mulcahey
7,396,177 B2 7/2008 Lapstun et al.
7,396,178 B2 7/2008 Lapstun et al.
7,403,012 B2 7/2008 Worsley et al.
7,413,363 B2 8/2008 Lapstun et al.
7,482,973 B2 1/2009 Tucker et al.
7,500,583 B1 3/2009 Cox
7,640,105 B2 12/2009 Nielsen et al.
2001/0029996 A1 10/2001 Robinson
2002/0053608 A1 5/2002 Zeck et al.
2002/0115472 A1 8/2002 Andress
2002/0130806 A1 9/2002 Taylor et al.
2003/0080897 A1 5/2003 Tranchina
2003/0184300 A1 10/2003 Bigelow
2003/0196585 A1 10/2003 McDonald et al.
2004/0051368 A1 3/2004 Caputo et al.
2004/0057795 A1 3/2004 Mayfield et al.
2004/0168358 A1 9/2004 Stump
2004/0220731 A1 11/2004 Tucker et al.
2005/0023367 A1 2/2005 Reighard
2005/0040222 A1 2/2005 Robinson
2005/0055142 A1 3/2005 McMurtry et al.
2005/0057745 A1 3/2005 Bontje
2005/0150399 A1 * 7/2005 Wiley ............................ 101/35

2005/0192727 A1 9/2005 Shostak et al.
2005/0278371 A1 12/2005 Funk et al.
2006/0026020 A1 2/2006 Waite et al.
2006/0055584 A1 3/2006 Waite et al.
2006/0077095 A1 4/2006 Tucker et al.
2006/0109131 A1 5/2006 Sen et al.
2006/0169776 A1* 8/2006 Hornbaker et al. ........... 235/385
2006/0220955 A1 10/2006 Hamilton
2006/0244454 A1 11/2006 Gard et al.
2006/0254820 A1 11/2006 Cole et al.
2006/0276198 A1 12/2006 Michelon et al.
2006/0282280 A1 12/2006 Stotz et al.
2006/0285913 A1 12/2006 Koptis
2006/0287900 A1 12/2006 Fiore et al.
2006/0289679 A1 12/2006 Johnson et al.
2007/0013379 A1 1/2007 Staples et al.
2007/0018632 A1 1/2007 Royle
2007/0100496 A1 5/2007 Forell
2007/0219722 A1 9/2007 Sawyer et al.
2007/0268110 A1 11/2007 Little
2007/0288195 A1 12/2007 Waite et al.
2008/0125942 A1 5/2008 Tucker et al.
2008/0204322 A1 8/2008 Oswald et al.
2008/0228294 A1 9/2008 Nielsen et al.
2008/0255795 A1 10/2008 Shkolnikov
2009/0013928 A1 1/2009 Nielsen et al.
2009/0085568 A1 4/2009 Cole
2009/0109081 A1 4/2009 Ryerson et al.
2009/0121933 A1 5/2009 Tucker et al.
2009/0171616 A1 7/2009 Zhang et al.
2009/0201178 A1 8/2009 Nielsen et al.
2009/0201311 A1 8/2009 Nielsen et al.
2009/0202101 A1 8/2009 Nielsen et al.
2009/0202110 A1 8/2009 Nielsen et al.
2009/0202111 A1 8/2009 Nielsen et al.
2009/0202112 A1 8/2009 Nielsen et al.
2009/0204238 A1 8/2009 Nielsen et al.
2009/0204466 A1 8/2009 Nielsen et al.
2009/0204614 A1 8/2009 Nielsen et al.
2009/0204625 A1 8/2009 Nielsen et al.
2009/0207019 A1 8/2009 Nielsen et al.
2009/0208642 A1 8/2009 Nielsen et al.
2009/0210098 A1 8/2009 Nielsen et al.
2009/0210284 A1 8/2009 Nielsen et al.
2009/0210285 A1 8/2009 Nielsen et al.
2009/0210297 A1 8/2009 Nielsen et al.
2009/0210298 A1 8/2009 Nielsen et al.
2009/0237408 A1 9/2009 Nielsen et al.
2009/0238414 A1 9/2009 Nielsen et al.
2009/0238415 A1 9/2009 Nielsen et al.
2009/0238416 A1 9/2009 Nielsen et al.
2009/0238417 A1 9/2009 Nielsen et al.
2009/0241045 A1 9/2009 Nielsen et al.
2009/0241046 A1 9/2009 Nielsen et al.
2009/0324815 A1 12/2009 Nielsen et al.
2009/0327024 A1 12/2009 Nielsen et al.
2010/0006667 A1 1/2010 Nielsen et al.
2010/0010862 A1 1/2010 Nielsen et al.
2010/0010863 A1 1/2010 Nielsen et al.
2010/0010882 A1 1/2010 Nielsen et al.
2010/0010883 A1 1/2010 Nielsen et al.
2010/0084532 A1 4/2010 Nielsen et al.
2010/0085054 A1 4/2010 Nielsen et al.
2010/0085185 A1 4/2010 Nielsen et al.
2010/0085376 A1 4/2010 Nielsen et al.
2010/0085694 A1 4/2010 Nielsen et al.
2010/0085701 A1 4/2010 Nielsen et al.
2010/0086671 A1 4/2010 Nielsen et al.
2010/0086677 A1 4/2010 Nielsen et al.
2010/0088031 A1 4/2010 Nielsen et al.
2010/0088032 A1 4/2010 Nielsen et al.
2010/0088134 A1 4/2010 Nielsen et al.
2010/0088135 A1 4/2010 Nielsen et al.
2010/0088164 A1 4/2010 Nielsen et al.
2010/0090700 A1 4/2010 Nielsen et al.
2010/0090858 A1 4/2010 Nielsen et al.
2010/0094553 A1 4/2010 Nielsen et al.
2010/0097224 A1* 4/2010 Prodanovich et al. ..... 340/572.1
2010/0117654 A1 5/2010 Nielsen et al.
2010/0188088 A1 7/2010 Nielsen et al.
2010/0188215 A1 7/2010 Nielsen et al.
2010/0188216 A1 7/2010 Nielsen et al.
2010/0188245 A1 7/2010 Nielsen et al.
2010/0188407 A1 7/2010 Nielsen et al.
2010/0189312 A1 7/2010 Nielsen et al.
2010/0189887 A1 7/2010 Nielsen et al.
2010/0198663 A1 8/2010 Nielsen et al.
2010/0201690 A1 8/2010 Nielsen et al.
2010/0201706 A1 8/2010 Nielsen et al.
2010/0205031 A1 8/2010 Nielsen et al.
2010/0205032 A1 8/2010 Nielsen et al.
2010/0205195 A1 8/2010 Nielsen et al.
2010/0205264 A1 8/2010 Nielsen et al.
2010/0205536 A1 8/2010 Nielsen et al.
2010/0205554 A1 8/2010 Nielsen et al.
2010/0205555 A1 8/2010 Nielsen et al.
2010/0228588 A1 9/2010 Nielsen et al.
2010/0245086 A1 9/2010 Nielsen et al.
2010/0247754 A1 9/2010 Nielsen et al.
2010/0253511 A1 10/2010 Nielsen et al.
2010/0253513 A1 10/2010 Nielsen et al.
2010/0253514 A1 10/2010 Nielsen et al.
2010/0255182 A1 10/2010 Nielsen et al.
2010/0256825 A1 10/2010 Nielsen et al.
2010/0256863 A1 10/2010 Nielsen et al.
2010/0256912 A1 10/2010 Nielsen et al.
2010/0256981 A1 10/2010 Nielsen et al.
2010/0257029 A1 10/2010 Nielsen et al.
2010/0257477 A1 10/2010 Nielsen et al.
2010/0259381 A1 10/2010 Nielsen et al.
2010/0259414 A1 10/2010 Nielsen et al.
2010/0262470 A1 10/2010 Nielsen et al.
2010/0262670 A1 10/2010 Nielsen et al.
2010/0263591 A1 10/2010 Nielsen et al.
2010/0268786 A1 10/2010 Nielsen et al.
2010/0272885 A1 10/2010 Olsson
2010/0285211 A1 11/2010 Nielsen et al.
2010/0318401 A1 12/2010 Nielsen et al.
2010/0318402 A1 12/2010 Nielsen et al.
2010/0318465 A1 12/2010 Nielsen et al.
2010/0324967 A1 12/2010 Nielsen et al.
2011/0007076 A1 1/2011 Nielsen et al.
2011/0020776 A1 1/2011 Nielsen et al.
2011/0022433 A1 1/2011 Nielsen et al.
2011/0035245 A1 2/2011 Nielsen et al.
2011/0035251 A1 2/2011 Nielsen et al.
2011/0035252 A1 2/2011 Nielsen et al.
2011/0035260 A1 2/2011 Nielsen et al.
2011/0035324 A1 2/2011 Nielsen et al.
2011/0035328 A1 2/2011 Nielsen et al.
2011/0040589 A1 2/2011 Nielsen et al.
2011/0040590 A1 2/2011 Nielsen et al.
2011/0046993 A1 2/2011 Nielsen et al.
2011/0046994 A1 2/2011 Nielsen et al.
2011/0046999 A1 2/2011 Nielsen et al.
2011/0060496 A1 3/2011 Nielsen et al.
2011/0060549 A1 3/2011 Nielsen et al.
2011/0095885 A9 4/2011 Nielsen et al.
2011/0131081 A1 6/2011 Nielsen et al.
2011/0135163 A1 6/2011 Nielsen et al.
2011/0137769 A1 6/2011 Nielsen et al.

FOREIGN PATENT DOCUMENTS

EP 0636393 2/1995
EP 1521331 A2 4/2005
EP 1852365 A1 11/2007
EP 1974638 10/2008
GB 2266863 11/1993
WO WO-9112119 8/1991
WO WO-9424584 A1 10/1994
WO WO9516827 6/1995
WO WO-9629572 9/1996
WO WO-9854600 A1 12/1998
WO WO-9854601 A1 12/1998
WO WO-9900679 A1 1/1999
WO WO-0228541 4/2002
WO WO-2004100044 A1 11/2004
WO WO-2004102242 A1 11/2004

| | | | |
|---|---|---|---|
| WO | WO-2005052627 | A2 | 6/2005 |
| WO | WO-2006015310 | A3 | 2/2006 |
| WO | WO-2006136776 | A1 | 12/2006 |
| WO | WO-2006136777 | A1 | 12/2006 |
| WO | WO-2007067898 | A2 | 6/2007 |

OTHER PUBLICATIONS

Co-Pending U.S. Appl. No. 12/568,087, filed Sep. 28, 2009.
Co-pending U.S. Appl. No. 12/607,843, filed Oct. 28, 2009.
Co-pending U.S. Appl. No. 12/622,768, filed Nov. 20, 2009.
Co-pending U.S. Appl. No. 12/639,041, filed Dec. 16, 2009.
Co-pending U.S. Appl. No. 12/639,373, filed Dec. 16, 2009.
International Search Report and Written Opinion, Application Serial No. PCT/US2008/55796, Oct. 14, 2008.
International Search Report and Written Opinion, Application Serial No. PCT/US2008/55798, Jul. 28, 2008.
International Search Report and Written Opinion, Application Serial No. PCT/US2009/005299, Dec. 12, 2009.
Notice of Allowance dated Nov. 6, 2009 from Co-Pending U.S. Appl. No. 11/685,602.
Office Action dated Nov. 18, 2009 from Co-Pending Canadian Application No. 2,623,466, filed Mar. 4, 2008.
Office Action dated Nov. 23, 2009 from Co-Pending Canadian Application No. 2,623,761, filed Mar. 4, 2008.
Office Action dated Sep. 17, 2009 from Co-Pending U.S. Appl. No. 11/685,602.
"New Identification Technology Raises Concerns over Privacy"; PBS Online NewsHour Report; Aug. 17, 2006; pp. 1-5; http://www.pbs.org/newshour/bb/science/july-dec06/rfid_08-17.html.
International Search Report and Written Opinion, Application Serial No. PCT/US2009/005348, Mar. 2, 2010.
International Search Report and Written Opinion, Application Serial No. PCT/US2009/005359, Feb. 8, 2010.
Office Action mailed Apr. 28, 2009 from Co-Pending U.S. Appl. No. 11/685,602.
Carey, B., "Tracking Shoes," Chicago Tribune Online Edition, Jan. 29, 2007; pp. 1-3; http://www.chicagotribune.com/services/site/premium/access-registered.intercept.
Fox, G. et al., "GPS Provides Quick, Accurate Data for Underground Utility Location" (as featured in Apr. 2002 issue of Trenchless Technology, http://www.woolpert.com/asp/articles/GPS-Provides.asp, Sep. 14, 2007, pp. 1 and 2.
Trimble Navigation Limited, H-Star Technology Explained, www.trimble.com, pp. 1-9, 2005.
Co-pending U.S. Appl. No. 11/685,602, filed Mar. 13, 2007.
Co-pending U.S. Appl. No. 12/236,688, filed Sep. 24, 2008.
Co-pending U.S. Appl. No. 12/429,929, filed Apr. 24, 2009.
Co-pending U.S. Appl. No. 12/363,951, filed Feb. 2, 2009.
Co-pending U.S. Appl. No. 12/364,369, filed Feb. 2, 2009.
Co-pending U.S. Appl. No. 12/364,359, filed Feb. 2, 2009.
Co-pending U.S. Appl. No. 12/364,339, filed Feb. 2, 2009.
GPS Technology Enhancing Underground Utility Locating, Underground Construction Magazine, Apr. 2010, 3 pages.
International Search Report and Written Opinion, Application Serial No. PCT/2010/000389, 11 pages.
Office Action dated Jun. 16, 2010 from Co-Pending Canadian Application No. 2,691,707, filed Feb. 10, 2010.
Office Action for Canadian Patent Application No. 2,623,761, dated Oct. 6, 2010 (2 pages).
Notice of Allowance dated Apr. 28, 2011 from U.S. Appl. No. 29/356,631.
Notice of Allowance dated Nov. 12, 2010 from U.S. Appl. No. 29/356,634.
Notice of Allowance dated Nov. 12, 2010 from U.S. Appl. No. 29/356,633.
Notice of Allowance dated Nov. 12, 2010 from U.S. Appl. No. 29/356,635.
European Search Report, Application No. 08743673.9, Feb. 28, 2011.
International Search Report and Written Opinion, Application Serial No. PCT/US10/45409, Nov. 18, 2010.
International Search Report and Written Opinion, Application Serial No. PCT/US10/45969, Nov. 18, 2010.
International Search Report and Written Opinion, Application Serial No. PCT/US10/45161, Oct. 29, 2010.
International Search Report and Written Opinion, Application Serial No. PCT/US2009/003957, Mar. 21, 2011.
International Search Report and Written Opinion, Application Serial No. PCT/US2010/036029, Sep. 7, 2010.
Office Action dated Oct. 6, 2010 from Canadian Application No. 2623761.
Office Action dated Mar. 9, 2011 from Australian Application No. 2008236526.
Office Action dated Mar. 9, 2011 from Australian Application No. 2008226627.
Bernold, L.. et al. "Equipment operator training in the age of internet2," Proceedings of 19th International Symposium on Automation and Robotics In Construction (ISRAC 2002), Sep. 2002 [retrieved on Nov. 12, 2010]. Retrieved from the Internet: <URL: http://fire.nist.gov/bfrIpubsibuild02IPDF/b02059.pdf>. p. 4, col. 2, para 2.
Office Action dated Feb. 1, 2011 from Canadian Application No. 2,691,707.
Office Action dated May 24, 2011 from U.S. Appl. No. 12/363,951.

* cited by examiner 262
264
400

244
242
270
268
410
246
282
284
286
290
288

MARKING SYSTEM AND METHOD

BACKGROUND

Underground man-made objects, such as utility lines and pipes (hereinafter "utility lines"), are very susceptible to damage from excavation activities. Local and federal laws require that notification be given to owners of underground utility lines in an area to be excavated before any excavation takes place. The owners of the utility lines typically must locate and mark the location of any underground utility lines.

The tasks of locating and marking underground utility lines can be performed by either the utility line owner or by third party contractors. A marking tool is typically used to mark the ground, pavement or other surfaces in order to provide a visual indication of the location of underground utilities. Paint is commonly used as the marker, and it is typically applied using a paint marking tool. The color of the paint is typically chosen based on the type of utility line being marked (e.g., red for a power line). However, other types of markers, such as other types of liquids, flags and stakes are also used, and different visual or other characteristics of the marker are used for representing different types of underground utility lines. For example, the color, shape or other characteristic of a flag marker can represent a particular type of underground utility line (e.g., a square shaped flag can be used to mark a power line).

When paint is used as the marker, a worker marks the location of an underground utility line using a paint marking tool to spray paint on the ground above the utility line. The paint marking tools typically used have a paint canister holder that is adapted to hold a single aerosol can of paint in an axial orientation with respect to the long axis of the aerosol can. The paint marking tool is typically designed to enable a user to walk or stand erect while dispensing the paint.

When an underground utility line is located, the worker will load a paint can of the appropriate color for the utility line being marked into the paint marking tool. When it is time to mark a different type of utility line, the worker must change the paint can to one of the appropriate color for the new utility line being marked.

SUMMARY

According to one aspect, a marking system may include a marker dispenser to hold and dispense a marker; a processor to determine at least one characteristic regarding the marker; and a triggering system in communication with the marker dispenser and the processor to trigger the marker dispenser to dispense the marker and the processor to store the at least one characteristic regarding the marker and time data associated with the dispensing of the marker.

According to another aspect, a marking tool may include a marker dispenser to hold and dispense a marker from a marker container. A tag may be affixed to the marker container, where the tag may store information regarding at least one characteristic of the marker. The marking tool may further include a tag reader to read the information from the tag, a processor to receive the information from the tag reader, and a triggering system to trigger the marker dispenser to dispense the marker from the marker container and the processor to store the information and time data associated with the dispensing of the marker by the marker dispenser.

According to yet another aspect, a method may include identifying a marker characteristic regarding a marker loaded into a marking tool; receiving activation of a trigger of the marking tool; dispensing the marker when the activation of the trigger is received; and storing the marker characteristic and time data when the activation of the trigger is received.

According to a further aspect, a system may include means for holding a container from which a marker is dispensed; means for identifying a marker characteristic regarding the marker in the container; means for receiving activation of a trigger; means for dispensing the marker from the container when the trigger is activated; and means for storing the marker characteristic and a timestamp when the trigger is activated.

According to another aspect, a system may include means for holding a container from which a marker is dispensed; means for identifying a marker characteristic regarding the marker in the container; means for receiving activation of a trigger; means for dispensing the marker from the container when the trigger is activated; and means for increasing a count value when the trigger is activated.

According to yet another aspect, a marking system may include means for providing a holder for a container from which a marker is dispensed; and means for identifying a marker characteristic regarding the marker in the container only when the container is initially placed into the holder.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements. Also, the following detailed description does not limit the invention.

Figure 1:
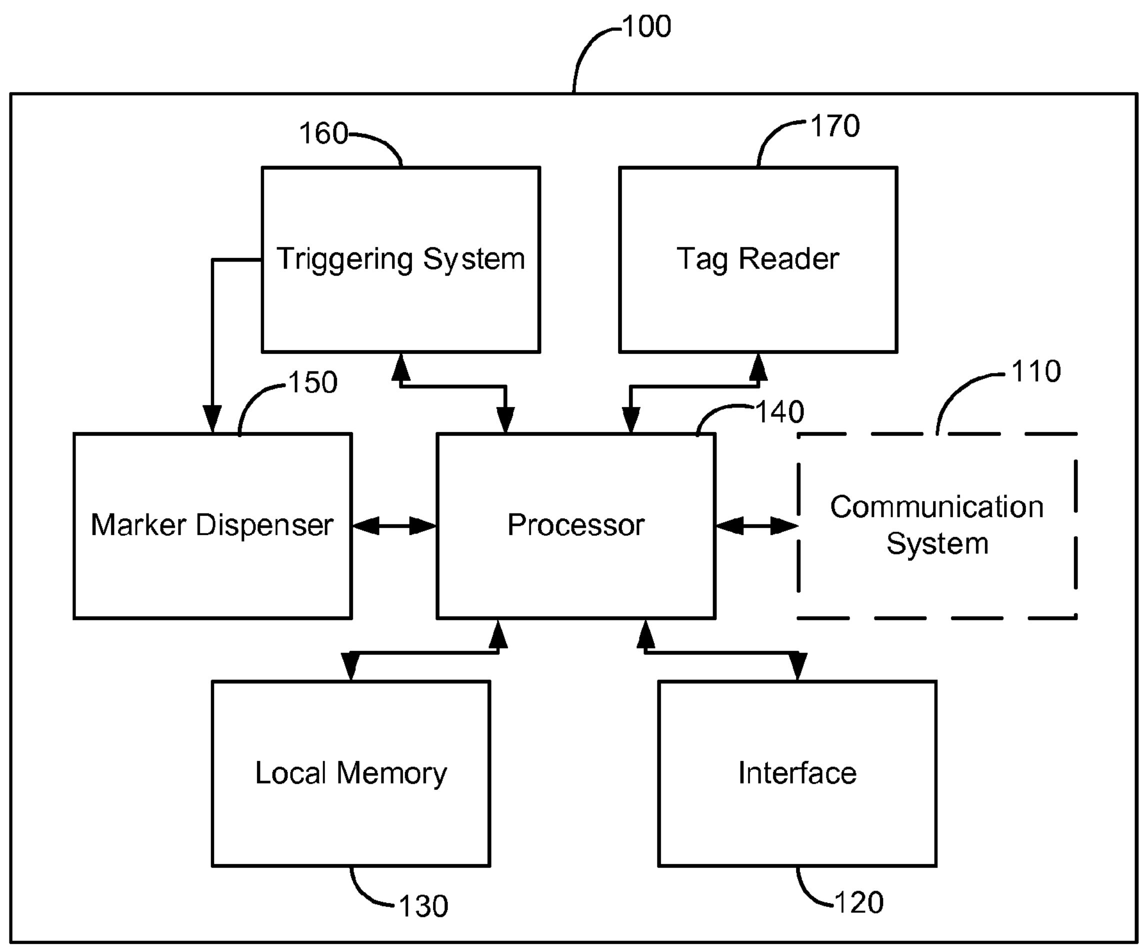
FIG. 1 is a block diagram of an exemplary marking system.

FIG. 1 is a block diagram of an exemplary marking system 100. The system 100 may include a communication system 110, an interface 120, a local memory 130, a processor 140, a marker dispenser 150, a triggering system 160 and a tag reader 170. In other implementations, system 100 may include additional or different components.

The system 100 may be used to dispense markers. In one exemplary application of the system 100, the markers may be used to mark underground utility lines, such as telecommunications (e.g., telephone and/or cable), power, gas, water, or sewer. The marker that is used to mark underground utility lines may include a liquid, such as paint, or objects, such as flags, stakes, etc.

A user may control the operation of the system 100 via interface 120. In one implementation, interface 120 may include a touch screen interface that can provide various operational controls and status indicators of the system 100, and can allow the user to navigate the controls by touching particular areas of the screen. In another implementation, the interface 120 may include another form of input and/or output, such as, for example, a display for displaying information and a keypad for entering information. In either situation, the interface 120 may provide operational controls to function as the triggering system 160.

The triggering system 160 may trigger the dispensing of markers and the storing of marking information. The marking information, which will be described in more detail below, may include information regarding a characteristic of the marker(s) being dispensed, time data (e.g., a timestamp and/or elapsed time information), and/or count data (e.g., a number of times that markers were dispensed). In operation, a user may engage a triggering mechanism in the triggering system 160 (explained in more detail below) in order to dispense the markers. When the triggering mechanism is engaged, the triggering system 160 may also initiate storing of the marking information. This may be done by sending a signal to the processor 140, which may cause processor 140 to store the marking information in local memory 130. Alternatively, or additionally, the processor 140 may store the marking information by transmitting the marking information for storage by a device or system external to system 100. In one implementation, marking information may be stored only when a marker is being dispensed by the marker dispenser 150.

The marker dispenser 150 may hold the markers and may also contain an actuation mechanism (not shown in FIG. 1) that causes the markers to be dispensed when the triggering system 160 is activated. As described above, the markers dispensed by the marker dispenser 150 may include a liquid (e.g., paint) or an object (e.g., flags or stakes). Details of the marker dispenser 150 will be discussed in more detail below.

The system 100 may also include a tag reader 170. In one implementation, tag reader 170 may include a device that can read tags. A "tag," as the term is used herein, may refer to any item that is capable of storing machine-readable information, such as a barcode, a radio frequency identification (RFID) device, or a near field communication (NFC) device. A tag may be passive, active, or any combination thereof. A passive tag may transmit data in response to signals received from tag reader 170. An active tag may continuously transmit data. Tags can be attached to the markers that are loaded into the marker dispenser 150 and can incorporate data that corresponds to one or more characteristics of the marker (e.g., paint color if the marker is paint). Other examples of marker characteristics include, but are not limited to, the type of marker and a shape of marker. The tag reader 170 may incorporate an antenna (not shown) to read the data from a tag (whether passive, active, or any combination thereof). The data read by the tag reader 170 can then be sent to the processor 140 for a determination of the corresponding characteristic. The corresponding characteristic can then be stored in local memory 130, displayed by the interface 120, and/or transmitted external to system 100.

Communication system 110 may include an interface for transmitting data to and/or receiving data from one or more external devices and/or systems located either local to or remote from the system 100. Communication system 110 may include any type of interface, such as an interface for communicating via Ethernet, Bluetooth, Wifi, radio frequency (RF), a wide area network (WAN), or another type of network or protocol.

In one implementation, communication system 110 may send marking information stored in local memory 130 to an external device/system and/or receive information from an external device/system. The marking information may be used by the external device/system to identify a marker dispensed by a user of system 100, identify a time at which the marker was dispensed, and/or determine an amount of the marker used at a particular location.

System 100, as broadly described herein, may be particularly suited for incorporation into marking tools for marking underground utilities. As discussed above, a marking tool is used to mark the ground, pavement or other surfaces in order to provide a visual indication of the location of underground utilities. The type of marker that may be used includes paint that may be supplied in aerosol canisters that are oriented axially with respect to the long axis of the aerosol canisters. The marking tool enables a user to walk or stand erect while dispensing the markers.

If system 100 is incorporated into a paint marking tool, a tag may be attached to the paint canisters to identify a characteristic of the paint, such as the color of the paint in the paint canister. The tag reader 170 can read this paint characteristic (e.g., the color information) from the tag when the paint canister is inserted into the marker dispenser 150, and the processor 140 can display the color information read by the tag reader 170 on the interface 120. Alternatively, or additionally, the color information may be provided to the user in other ways. For example, the color information may be audibly provided to the user (e.g., via a generated voice or a series of beeps or honks). The color information may also, or alternatively, be provided to the user visually in a manner other than via interface 120. For example, the color information may be provided on an object worn or carried by the user (e.g., a pair of glasses, a bracelet, a ring, etc. having display capabilities and/or being capable of changing color).

In one implementation, the processor 140 can estimate how much paint of a particular color has been dispensed. The processor 140 could do this by maintaining a separate timer for each color. The timer for a particular color would increase its count every time the triggering mechanism is activated and that color is mounted in the marker dispenser 150 (which can be determined by reading the tag on the paint canister using the tag reader 170). This information can be useful for managing paint inventory or determining whether the amount of paint used at a particular location is reasonable given the job to be performed at that location.

A paint marking tool is just one possible application of system 100. System 100 can be applied to any marking system that uses markers that can be affixed with tags. Any marker characteristic that a user would find useful can be stored on the tag that is affixed to the marker.

Figure 2:
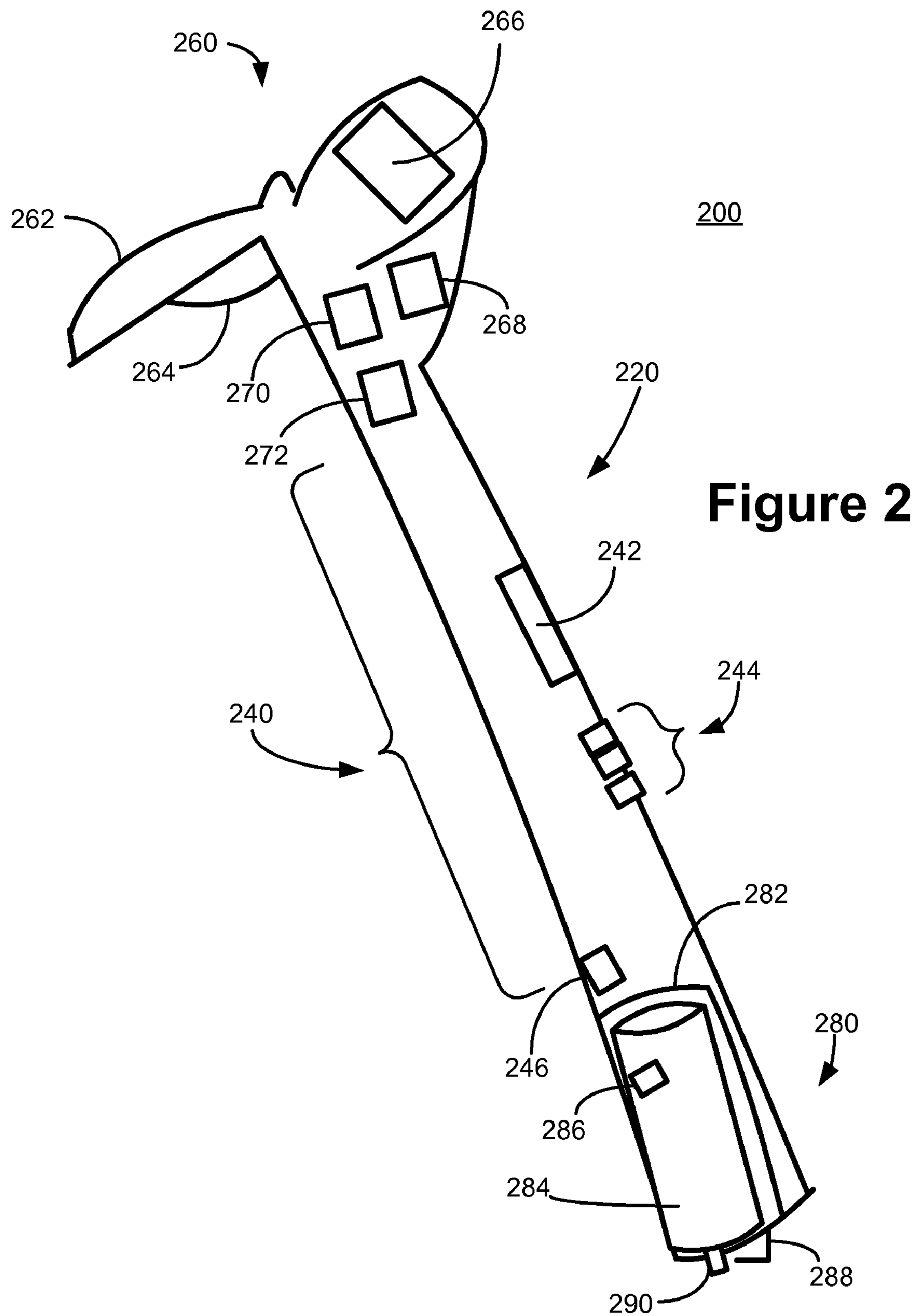
FIG. 2 is a diagram of an exemplary marking tool.

FIG. 2 is a diagram of an exemplary marking tool 200. For the description to follow, assume that the marking tool 200 uses paint as the marker. However, it should be appreciated that any other marker, such as another type of liquid, flags, stakes, etc., may be used in other implementations.

The marking tool 200 may include a housing 220 with an elongated center housing portion 240, a top housing portion 260 and a bottom housing portion 280. The housing 220 may be formed of any at least semi-rigid material, and may be formed of a lightweight material such as aluminum or plastic.

A paint canister holder 282 may be attached to the bottom housing portion 280. The paint canister holder 282 may include an open-ended tubular structure that is attached to the bottom housing portion 280 by any suitable attachment mechanisms, such as rivets, adhesive, mechanical fasteners or the like. The paint canister holder 282 may be formed of any material such as injection-molded plastic, formed sheet metal or any other appropriate material that may be fabricated into an open tubular configuration or any other configuration that will serve to support a paint canister 284 with the paint canister axis substantially parallel to the housing 220.

A tag reader 246, which may include a device that can read tags, may be mounted on or located within the housing 220. The tag reader 246 may incorporate an antenna (not shown)

that is capable of reading data from a tag. When a tag 286 is attached to a paint canister 284 that incorporates data that corresponds to characteristics of the paint (e.g., paint color), the tag reader 246 may read that data. Other examples of marker characteristics include, but are not limited to, the type of marker and the shape of marker. The data read by the tag reader 246 can then be sent to a processor 268 for a determination of the corresponding characteristic. The corresponding characteristic can then be provided to the user, stored in local memory 270, and/or transmitted external to marking tool 200.

The tag reader 246 may be mounted anywhere on the housing or on the paint canister holder 282. However, the tag reader 246 does not have to be mounted anywhere on the marking tool 200 itself. For example, the tag reader 246 may be carried by a user. In general, the tag reader 246 may be mounted or located at any location, as long as it can receive data transmitted from the tag 286.

An actuation mechanism 288 may be attached to the bottom housing portion 280 at a location from which it can actuate the nozzle 290 of the paint canister 284. The actuation mechanism 288 may include a rigid material that depresses the nozzle 290 when actuated. However, any mechanism may be used to actuate the nozzle 290 of the paint canister 284.

A handle 262 may be provided at the top housing portion 260. The handle 262 may be formed of injection-molded plastic or any other appropriate material, and may be attached to the top housing portion 260 by rivets, adhesive, or any other suitable means. A mechanical trigger 264 may be provided on the top housing portion 260. The mechanical trigger 264 may be located on the handle 262 and attached using any suitable means.

The display 266 may be provided on the top housing portion 260. The display 266 may include a touch-screen display for displaying information to a user, as well as acting as an input device. The processor 268 and the local memory 270 are located in the housing 220. In one implementation, the processor 268 and local memory 270 may be located in the top housing portion 260 so as to be in close proximity to the display 266 and mechanical trigger 264. In another implementation, the processor 268 and local memory 270 may be located elsewhere within the housing 220.

A timer 272 may be provided on the top housing portion 260. The timer 272 may include any device that can output time data to some level of accuracy (e.g., accuracy to the minute, the second, the millisecond, etc.). In one implementation, the timer 272 may be capable of generating the time data itself. In this situation, the timer 272 may take the form of a clock. In another implementation, the timer 272 may receive the time data from another device external to marking tool 200. In this situation, the timer 272 may take the form of a receiver. In some situations, it may be beneficial for the timer 272 to be synchronized to another timer. The timer 272 may output time data to the processor 268.

A wireless communication antenna 242 may be located on the housing 220, and used to transmit data, such as marking information stored in local memory 270, to an external device/system and/or to receive information from an external device/system.

The marking tool 200 may also include one or more input/output ports 244, such as USB, SCSI, Firewire, Ethernet and/or other ports, for interfacing with other equipment and/or computers.

In operation, a user operates the marking tool 200 while standing or walking in an upright manner. A user may control the operation of the tool 200 via display 266, a mechanical trigger 264, and/or a wireless or wired (hereinafter "wireless/wired") interface that may be provided via wireless communication antenna 242 and/or input/output ports 244.

The various operational controls and status indicators of the tool 200 are displayed on display 266, and the user can also navigate the controls by touching particular areas of the display 266. Although a touch-screen display is one form of the display 266, any other type of display or interface may be used such as, for example, a display for displaying information and a keypad for entering information. The user may use the display 266 to trigger the dispensing of paint and the storing of marking information.

The mechanical trigger 264 may trigger the dispensing of paint and the storing of marking information. In one implementation, the tool 200 may store the marking information only when paint is being dispensed. This may be accomplished by using a mechanical trigger 264 that, when activated by the user, triggers both the actuation mechanism 288 for the paint canister 284 and the storing of the marking information by the processor 268.

The mechanical trigger 264 can trigger the actuation mechanism 288 via a mechanical connection between the trigger 264 and the actuation mechanism 288. For example, the actuation mechanism 288 can be a rigid material that is connected to the mechanical trigger 264 via a mechanical linkage (not shown), in which case depressing the mechanical trigger 264 may cause the actuation mechanism to apply pressure to the nozzle 290 of the paint canister 284. However, the mechanical trigger 264 may also, or alternatively, trigger the actuation mechanism 288 via an electronic connection. The electronic connection may be a hardwired connection or a wireless connection. If the connection between the mechanical trigger 264 and the actuation mechanism 288 is an electronic connection, the actuation mechanism 288 may include a mechanism for generating the force necessary to depress the nozzle 290 of the paint canister 284.

The wireless/wired interface may be capable of capturing signals that reflect a user's intent. For example, the wireless/wired interface may include a microphone that can capture a user's intent by capturing the user's audible commands. Alternatively, the wireless/wired interface may interact with a device that monitors a condition of the user, such as eye movement, brain activity, or heart rate. In either event, the wireless/wired interface may generate signals that may be sent to the processor 268 for processing. The processor 268 may use the signals to trigger the dispensing of paint and the storing of marking information.

Figure 3:
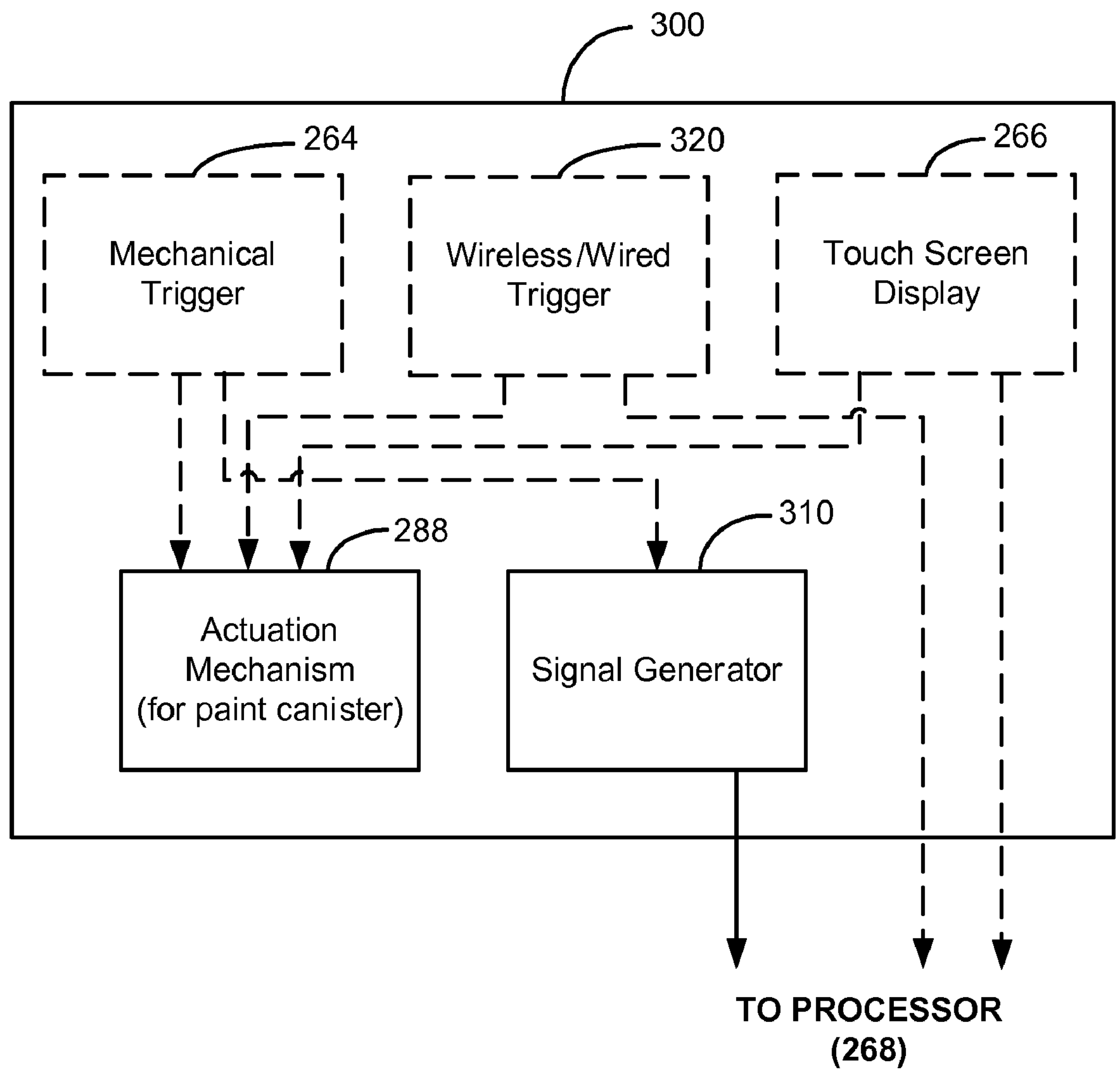
FIG. 3 is a diagram of an exemplary triggering system that may be used in the marking tool of FIG. 2.

FIG. 3 is a diagram of one embodiment of a triggering system 300 that may be used in the marking tool 200 of FIG. 2. As shown in FIG. 3, the triggering system 300 may include the mechanical trigger 264, a wireless/wired trigger 320, and/or a touch screen display 266, the mechanical actuation device 288, and a signal generator 310.

In operation, a user may trigger the storing of the marking information and the dispensing of paint by activating the mechanical trigger 264. The storing of the marking information and the dispensing of paint may also, or alternatively, be triggered by a trigger signal from wireless/wired trigger 320 or by choosing a command that is displayed on the touch screen display 266. It should be appreciated that triggering system 300 may include a mechanical trigger 264, a trigger signal from wireless/wired trigger 320, a trigger command on a touch screen display 266, or a combination of a mechanical trigger 264, a trigger signal from wireless/wired trigger 320, and/or a trigger command on a touch screen display 266 for initiating the storing of the marking information and the dispensing of paint.

When a user activates the mechanical trigger 264, the mechanical actuation device 288 and the signal generator 310 are both activated. The mechanical actuation device 288 actuates the nozzle 290 of the paint canister 284, thus dispensing paint out of the paint canister 284. The signal generator 310, when activated, sends a signal to the processor 268 indicating that the mechanical trigger is being activated. As discussed above, this signal could be used to trigger the storing of marking information and/or a timer for keeping track of how much paint of a particular color has been dispensed when a tag 286 that identifies the paint color is attached to the paint canister 284 that is mounted in the paint canister holder 282.

The mechanical trigger 264 can activate the mechanical actuation device 288 via a mechanical connection, e.g., a mechanical linkage, between the mechanical trigger 264 and the mechanical actuation device 288. Alternatively, the mechanical trigger 264 can activate the mechanical actuation device 288 via a wired or wireless electronic connection between the mechanical trigger 264 and the mechanical actuation device 288.

If a trigger signal from wireless/wired trigger 320 is used by the user to initiate marking information storing and paint dispersal, the wireless/wired trigger 320 may send a signal to both the mechanical actuation device 288 and the processor 268. The signal sent to the mechanical actuation device 288 by the wireless/wired trigger 320 may result in the actuation of the nozzle 290 of the paint canister 284 by the mechanical actuation device 288. The signal sent to the processor 268 by the wireless/wired trigger 320 may trigger the storing of the marking information. The signals sent by the wireless/wired trigger 320 to the mechanical actuation device 288 and the processor 268 may be sent via a wired or wireless connection.

If a command on the touch screen display 266 is used by the user to initiate storing of marking information and paint dispersal, the touch screen display 266 can send a signal to both the mechanical actuation device 288 and the processor 268. The signal sent to the mechanical actuation device 288 by the touch screen display 266 may result in the actuation of the nozzle 290 of the paint canister 284 by the mechanical actuation device 288. The signal sent to the processor 268 by the touch screen display 266 may trigger the storing of the marking information. The signals sent by the touch screen display 266 to the mechanical actuation device 288 and the processor 268 may be sent via a wired or wireless connection.

The marking information may be used by an external device and/or system to identify which markers were dispensed, when the markers were dispensed, and/or an amount of markers that were dispensed. The marking information may be useful to determine whether a user dispensed the correct marker(s) (e.g., the correct color paint) in a particular location. Also, the marking information may be used to visually depict (e.g., in real time as the dispensing occurs) or reconstruct (e.g., at a later time after the dispensing is complete) the dispensing of the markers on an electronic representation of the area that is currently being marked or was previously marked. Also, the marking information may be used to determine whether the job was completed correctly (e.g., that the amount of paint dispensed at the location was reasonable given the job that was to be performed at the location).

Figure 4:
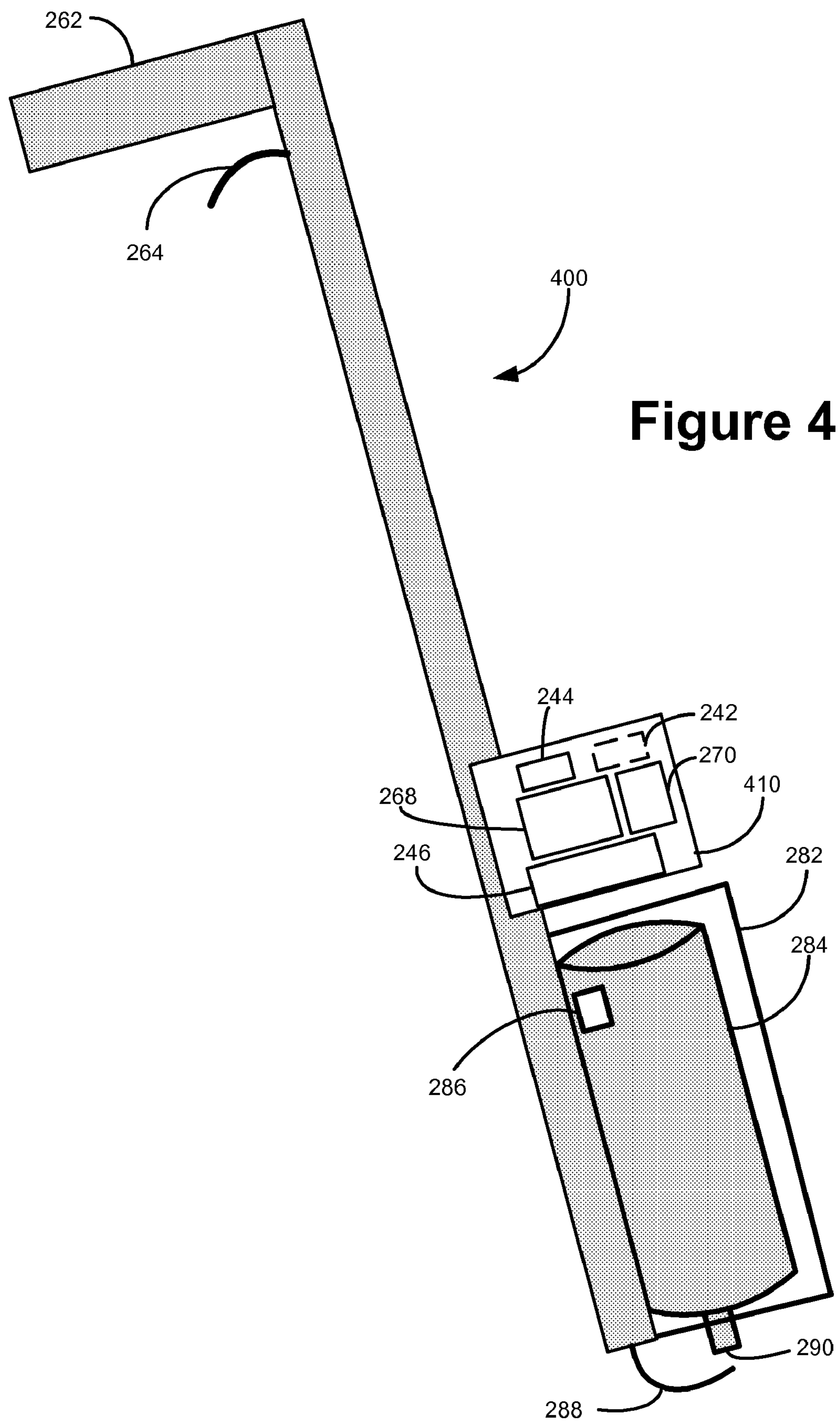
FIG. 4 is a diagram of another exemplary marking tool.

As shown in FIG. 4, the marking system 100 may be incorporated into already existing marking tools by locating the electronics on a board 410 that can be mounted onto an existing marking tool 400. The processor 268, local memory 270, input/output ports 244, tag reader 246 and/or wireless communication antenna 242 may be mounted on the board 410. The board 410 can be attached to the marking tool 400 using any means, such as with fasteners, clamps, glue, etc.

Figure 5:
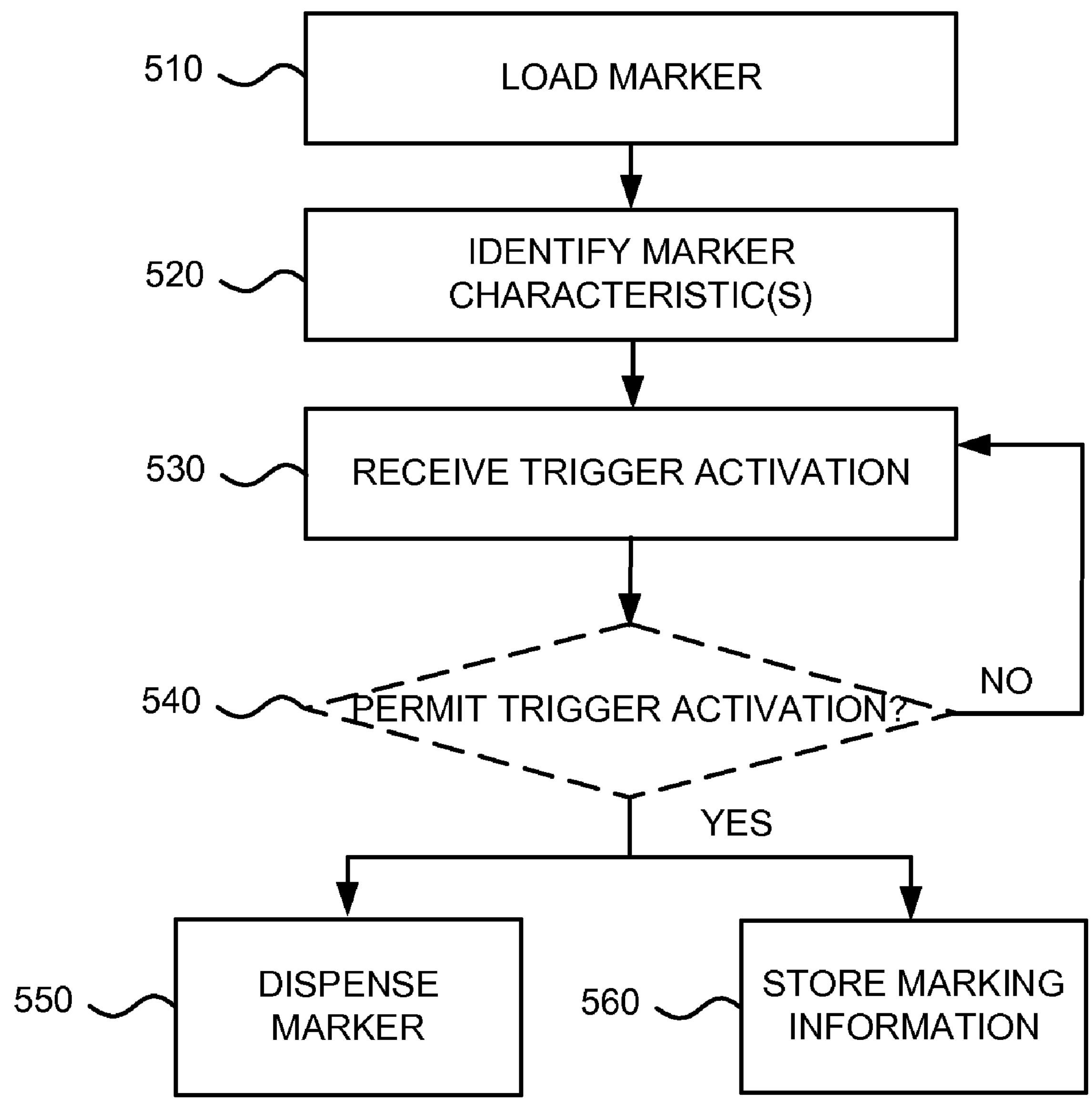
FIG. 5 is a flowchart of an exemplary process for marking an area.

FIG. 5 is a flowchart of an exemplary process for marking an area. The process of FIG. 5 may begin with a user of a marking tool, such as marking tool 200 (FIG. 2), being dispatched to a location to be marked. The user might be given a ticket that identifies what utilities the user needs to mark at the location. The ticket might specify, for example, the location to be marked, the day and/or time that the location is to be marked, and/or whether the user is to mark the location for telecommunications (e.g., telephone and/or cable), power, gas, water, and/or sewer. The user might arrive at the location and take his/her marking tool out of his/her vehicle. In some situations, the user might load his/her pockets with extra markers (e.g., extra canisters of the same color of paint or different colors of paint).

A marker may be loaded into the marking tool (block 510). For example, the user may load a paint canister 284 of the appropriate color into paint canister holder 282. If the user is going to mark power, for example, the user might load a paint canister 284 containing red paint. The paint canister 284 may be loaded such that nozzle 290 extends out of the bottom of the marking tool 200, as illustrated in FIG. 2.

In one implementation, as described above, a tag 286 may be affixed to the paint canister 284. The tag 286 may store information regarding one or more characteristics of the marker. For example, the tag 286 may identify the type of marker (e.g., paint, flag, stake, etc.), the color of marker (e.g., orange, red, yellow, blue, or green), and/or the shape of the marker (e.g., square, triangular, circular, etc.).

The marker characteristic(s) may be identified (block 520). In one implementation, the marker characteristic(s) may be automatically determined. For example, data from the tag 286 may be read by tag reader 246 and sent to processor 268. The processor 268 may determine the marker characteristic(s) from this data, and cause information regarding the marker characteristic(s) to be presented to the user (e.g., visually and/or audibly).

For example, a user interface may identify a characteristic of the marker. The user interface may optionally request the user to confirm that the user intended to load a marker with the identified characteristic. The confirmation may establish that the user actually looked at the user interface before performing any marking operation. In one implementation, the user may be unable to activate a trigger for dispensing a marker if the user does not confirm that the correct marker is loaded.

In another implementation, the marker characteristic(s) may be manually determined. For example, the user may specify the marker characteristic(s) via a user interface. The user interface may identify a number of possible characteristics (e.g., paint colors) of the marker. In this case, the user interface may request that that user select the paint color to be dispensed. The user interface may also identify the utility that corresponds to each of the possible paint colors so that the user can confirm that the correct marker is loaded.

Trigger activation may be received (block 530). For example, the user may effect trigger activation by applying pressure to the mechanical trigger 264 with his/her hand. Alternatively, or additionally, the user may effect trigger activation by, for example, speaking a particular command to cause a trigger signal to be output by wireless/wired trigger 320. Alternatively, or additionally, the user may effect trigger activation by touching a particular area of display 266 to cause a trigger command to be output by display 266.

It may optionally be determined whether to permit trigger activation (block 540). For example, the user may be required to confirm that a marker with the correct marker characteristic was loaded before trigger activation may be permitted. Alternatively, the marking tool 200 may be loaded with information from the user's ticket. In this case, trigger activation may be prevented when the marker characteristic of the marker does not match the ticket information. For example, if the ticket information indicates that the user is to dispense blue and yellow paint at a particular location, then activation of the trigger may be permitted if blue or yellow paint is loaded into the marking tool 200, and activation of the trigger may be prevented otherwise.

If activation of the trigger is permitted, then a marker may be dispensed (block 550), and marking information may be stored (block 560). To dispense a marker (block 550), the actuation device 288 may be activated to cause the nozzle 290 of the paint canister 284 to be depressed, which may cause paint from the paint canister 284 to be output via the nozzle 290.

To store marking information (block 560), a signal may be sent to the processor 268. The signal may be sent from the signal generator 310, the wireless/wired trigger 320, and/or the display 266, as described above. The signal may instruct the processor 268 to store the marking information. For example, the processor 268 may store the marking information in local memory 270. In this case, the processor 268 may create an entry in local memory 270. Alternatively, or additionally, the processor 268 may store the marking information by transmitting the marking information for storage by a device or system external to marking tool 200.

Figure 6A:
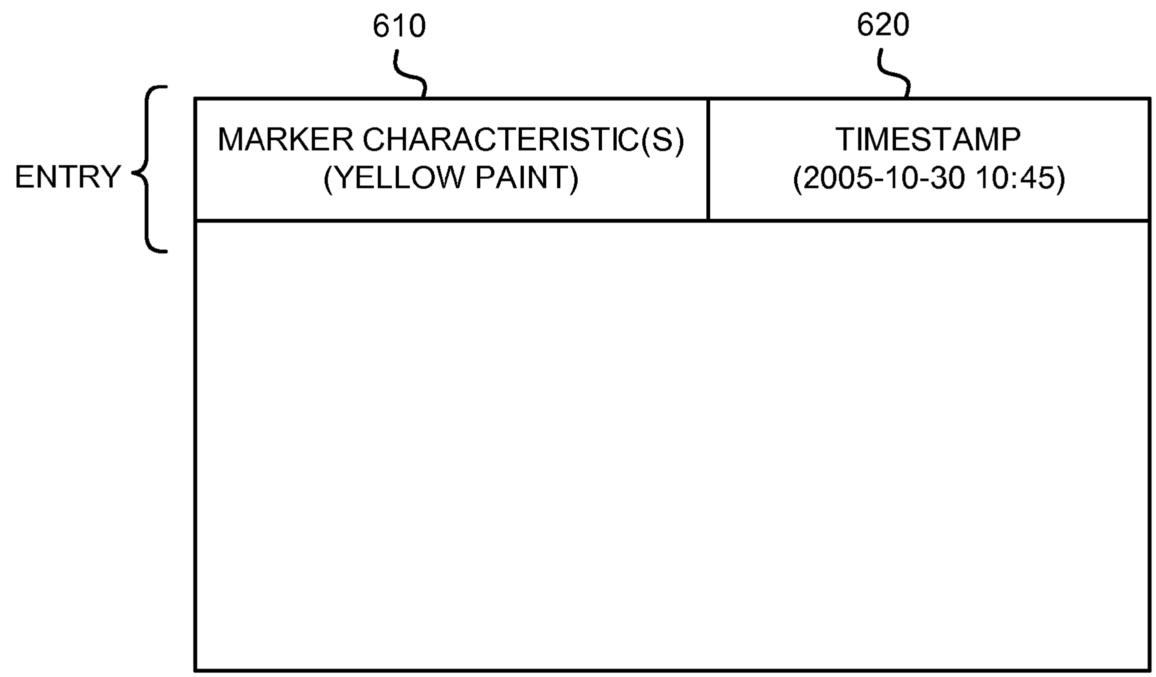
FIGS. 6A-6C are diagrams of exemplary entries that can created.

FIG. 6A is a diagram of an exemplary entry that may be created. As shown in FIG. 6A, an entry may include a marker characteristic(s) field 610 and a timestamp field 620. The marker characteristic(s) field 610 may include information regarding one or more marker characteristics, such as marker color, marker shape, or marker type. The information in the marker characteristic(s) field 610 is shown in FIG. 6A as "yellow" or "yellow paint"—although any type of descriptive information may be used. The timestamp field 620 may include time data that identifies the day and/or time that the marker was dispensed. The time data in the timestamp field 620 is shown in FIG. 6A as 10:45 a.m. on Oct. 20, 2005—although any type of date and/or time code may be used. As explained above, the marking information may be useful to determine whether the user dispensed the correct marker(s) (e.g., the correct color paint) in a particular location. For example, the user's ticket may identify what utility lines were to be marked in the area. The marking information may help insure that the job was completed correctly.

Figure 6B:
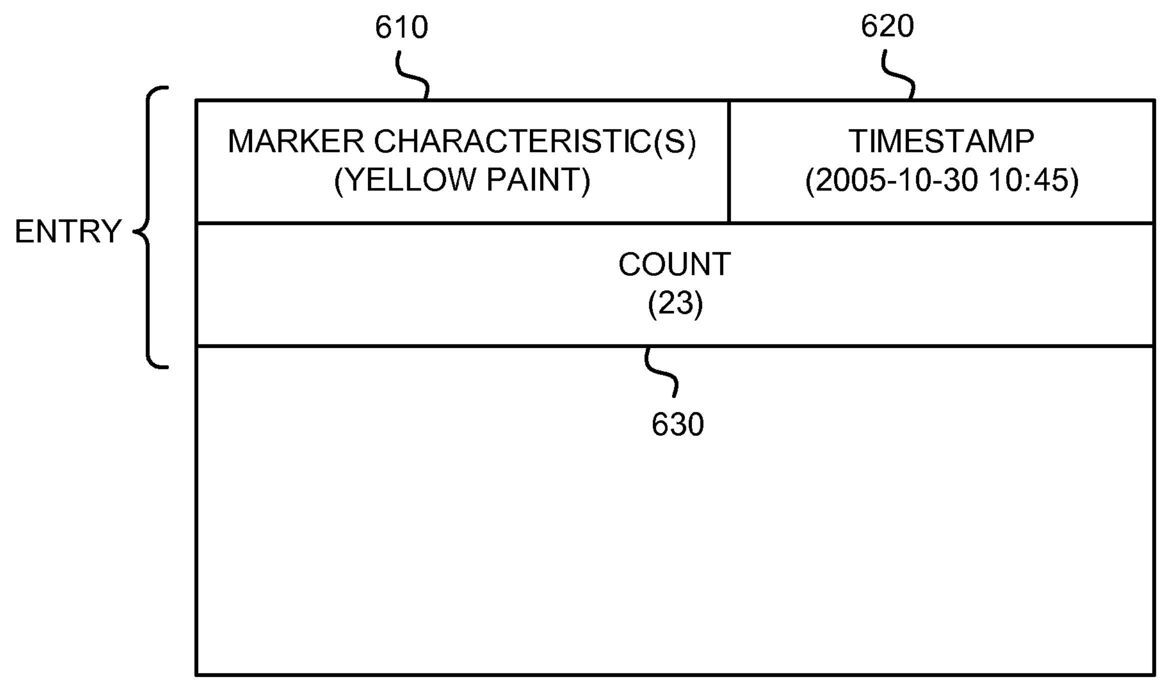

FIG. 6B is a diagram of another exemplary entry that may be created. As shown in FIG. 6B, an entry may include a marker characteristic(s) field 610, a timestamp field 620, and a count field 630. The marker characteristic(s) field 610 and the timestamp field 620 may be similar to the similarly named fields in FIG. 6A. The count field 630 may include information that identifies the number of times that the user activated the trigger to dispense a marker (e.g., yellow paint). The information in the count field 630 is shown in FIG. 6B as twenty-three—although any count value can be used. The information in the count field 630 may be useful to determine or estimate an amount of paint that was dispensed at the location and, thus, whether the amount of paint was reasonable given the job that was to be performed.

Figure 6C:
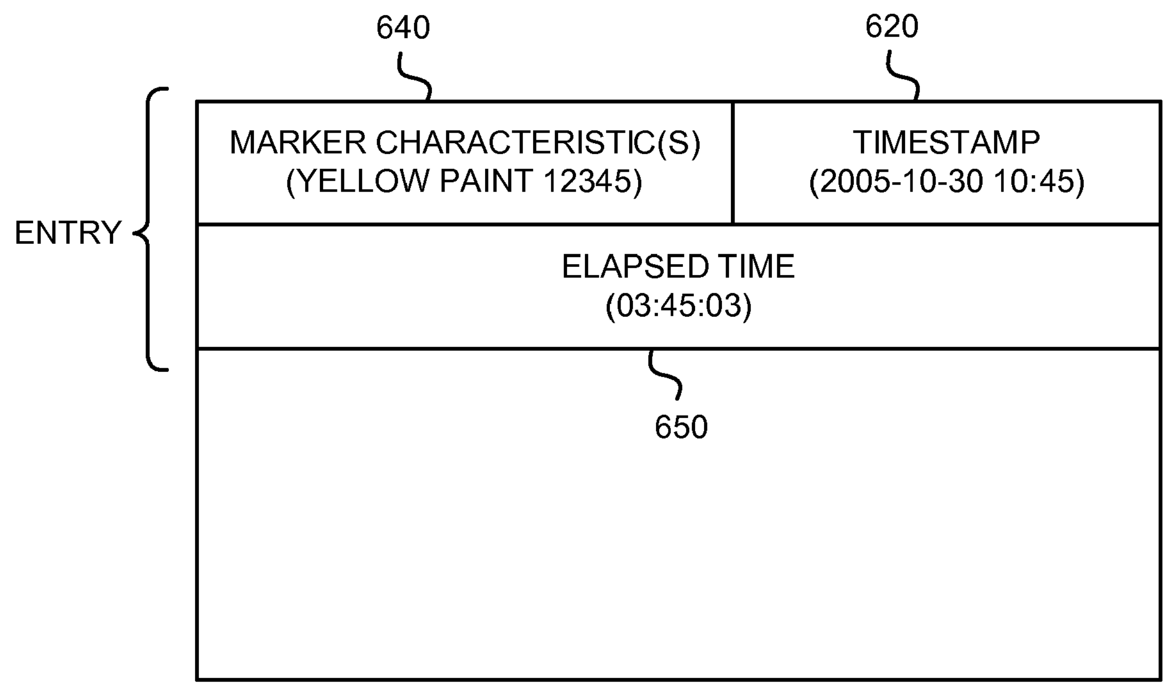

FIG. 6C is a diagram of another exemplary entry that may be created. As shown in FIG. 6C, an entry may include a marker characteristic(s) field 640, a timestamp field 620, and an elapsed time field 650. The marker characteristic(s) field 640 and the timestamp field 620 may be similar to the similarly named fields in FIG. 6A. In this case, however, the marker characteristic(s) field 640 may additionally store an identifier that identifies a particular marker (e.g., a particular canister of paint). The identifier is shown in FIG. 6C as "12345"—although any type of identifier may be used.

The elapsed time field 650 may include information that identifies the amount of time that has elapsed from when the user activated the trigger for dispensing a marker (e.g., yellow paint) to when the user ceased activating the trigger. The information in the elapsed time field 650 is shown in FIG. 6C as three minutes, forty five seconds, and three one hundredths of a second—although any time code can be used. The information in the elapsed time field 650 may be useful to determine or estimate when a supply of markers is nearly empty. The information in the elapsed time field 650 may help determine when to replace the canister. The elapsed time or a signal indicating that a supply of markers needs to be replaced may be presented to the user visually and/or audibly. The information in the elapsed time field 650 may also, or alternatively, be useful to determine or estimate an amount of markers used in a particular location.

While three exemplary entries have been described with regard to FIGS. 6A-6C, an entry may include more, fewer, different, or combinations of the fields shown in FIGS. 6A-6C.

The foregoing description is not intended to be exhaustive or to limit the description to the precise form disclosed. Modifications and variations are possible in light of the above disclosure or may be acquired from practice of the invention.

For example, the processors 140 and 268 can be general purpose computers. Alternatively, they can be special purpose computers, programmed microprocessors or microcontrollers and peripheral integrated circuit elements, ASICs or other integrated circuits, hardwired electronic or logic circuits such as discrete element circuits, programmable logic devices such as FPGA, PLD, PLA or PAL or the like. In general, any device capable of executing code can be used to implement processors 140 and 268. Local memories 130 and 270 can be implemented with any type of electronic memory and/or storage device using any type of media, such as magnetic, optical or other media.

Further, while a series of blocks have been illustrated in FIG. 5, the order of the blocks may differ in other implementations. Also, non-dependent blocks may be performed in parallel.

Also, it has been described that information regarding an elapsed time can be used to determine or estimate when a supply of markers is nearly empty. In another implementation, a sensor may be used to detect a weight of a paint canister 284. The sensor may be placed on the paint canister 284 or within the paint canister holder 282. The weight of the paint canister 284 may be used to estimate how full or empty the paint canister 284 is. This information may be provided to an operator of the marking tool 200 visually and/or audibly. In one implementation, replacing the paint canister 284 may trigger the identification of the marker characteristic (e.g., paint color) by the tag reader 246. This may help reduce the overall battery life of the tag reader 246 and/or the tag 286 by limiting the number of times that the tag reader 246 is used (e.g., only obtain the marker characteristic when the paint canister 284 is initially loaded into paint canister holder 282).

It will be apparent that aspects, as described above, may be implemented in many different forms of software, firmware, and hardware in the implementations illustrated in the figures. The actual software code or specialized control hardware used to implement these aspects is not limiting of the description provided herein. Thus, the operation and behavior of the aspects were described without reference to the specific software code—it being understood that software and control hardware can be designed to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A marking system, comprising:
- a marker dispenser to hold and dispense at least one marker;
- a processor to record at least one characteristic of the dispensed marker; and
- a triggering system in communication with the marker dispenser and the processor to trigger the marker dispenser to dispense the marker and the processor to store the at least one characteristic regarding the marker and time data associated with the dispensing of the marker,
- wherein a tag is associated with the marker, the tag storing the at least one characteristic; and
- wherein the system further comprises:
- a tag reader to read the at least one characteristic from the tag, and
- wherein the at least one characteristic comprises a type of the dispensed marker, a color of the dispensed marker, or a shape of the dispensed marker.

2. The system of claim 1, wherein the tag is affixed to a container that holds the marker.

3. The system of claim 1, wherein the tag is a radio frequency identification (RFID) tag and the tag reader is an RFID reader.

4. The system of claim 1, wherein the processor is further configured to present the at least one characteristic on a user interface.

5. The system of claim 4, wherein the user interface is configured to identify the at least one characteristic and a type of utility line to which the at least one characteristic corresponds.

6. The system of claim 4, wherein the user interface is configured to request confirmation that the at least one characteristic is correct before the triggering system can trigger the marker dispenser or the processor.

7. The system of claim 1, further comprising:
- a user interface to:
  - present a number of possible marker characteristics, and
  - receive selection of at least one of the possible marker characteristics as the at least one characteristic.

8. The system of claim 1, wherein the marker dispenser comprises:
- a paint canister holder adapted to support a paint canister, and
- an actuation mechanism to dispense paint from the paint canister when the triggering system is activated.

9. The system of claim 1, wherein the triggering system comprises:
- a trigger,
- an actuation mechanism to cause a marker container to dispense the marker when the trigger is activated, and
- a signal generator to send a signal to the processor when the trigger is activated.

10. The system of claim 9, wherein the marker container comprises an aerosol canister and the actuation mechanism comprises a rigid material that applies pressure to a nozzle on the aerosol canister when the trigger is activated.

11. The system of claim 9, wherein a decision of whether the trigger is permitted to be activated is based on the at least one characteristic.

12. The system of claim 11, wherein the decision is based on a comparison of the at least one characteristic to information from a ticket.

13. The system of claim 11, wherein the decision is based on a confirmation that the at least one characteristic is correct.

14. The system of claim 1, wherein the time data indicates when the marker was dispensed or an amount of time that the marker was dispensed.

15. A marking system, comprising:
- a marker dispenser to hold and dispense at least one marker;
- a processor to record at least one characteristic of the dispensed marker; and
- a triggering system in communication with the marker dispenser and the processor to trigger the marker dispenser to dispense the marker and the processor to store the at least one characteristic regarding the marker and time data associated with the dispensing of the marker,
- wherein triggering system is configured to:
- receive a trigger activation, and
- cause the processor to increase a count value in response to the trigger activation.

16. A marking tool, comprising:
- a marker dispenser to hold and dispense a marker from a marker container, a tag being affixed to the marker container, the tag storing information regarding at least one characteristic of the marker;
- a tag reader to read the information from the tag;
- a processor to receive the information from the tag reader; and
- a triggering system to trigger the marker dispenser to dispense the marker from the marker container and the processor to store the information and time data associated with the dispensing of the marker by the marker dispenser.

17. The tool of claim 16, wherein the tag is a radio frequency identification (RFID) tag and the tag reader is an RFID reader.

18. The tool of claim 16, wherein the at least one characteristic comprises a type of the marker, a color of the marker, or a shape of the marker.

19. The tool of claim 16, wherein the processor is further configured to present the information on a user interface.

20. The tool of claim 19, wherein the user interface is configured to identify the at least one characteristic and a type of utility line to which the at least one characteristic corresponds.

21. The tool of claim 19, wherein the user interface is configured to request confirmation that the at least one characteristic is correct before the triggering system can trigger the marker dispenser or the processor.

22. The tool of claim 16, wherein the marker dispenser comprises:
- a paint canister holder adapted to support a paint canister, and
- an actuation mechanism to dispense paint from the paint canister when the triggering system is activated.

23. The tool of claim 16, wherein the triggering system comprises:
- a trigger,
- an actuation mechanism to cause the marker container to dispense the marker when the trigger is activated, and
- a signal generator to send a signal to the processor when the trigger is activated.

24. The tool of claim 23, wherein the marker container comprises an aerosol canister and the actuation mechanism comprises a rigid material that applies pressure to a nozzle on the aerosol canister when the trigger is activated.

25. The tool of claim 23, wherein a decision of whether the trigger is permitted to be activated is based on the at least one characteristic.

26. The tool of claim 25, wherein the decision is based on a comparison of the at least one characteristic to information from a ticket.

27. The tool of claim 25, wherein the decision is based on a confirmation that the at least one characteristic is correct.

28. The tool of claim 16, wherein the time data indicates when the marker was dispensed or an amount of time that the marker was dispensed.

29. The tool of claim 26, wherein the triggering system is further configured to:
receive a trigger activation, and
cause the processor to increase a count value based on the received trigger activation.

30. The tool of claim 16, further comprising:
a sensor to detect a weight of the marker container.

31. The tool of claim 30, wherein information regarding the weight of the marker container is provided to a user of the tool.

32. A method, comprising:
identifying a marker characteristic regarding a marker loaded into a marking tool;
receiving activation of a trigger of the marking tool;
dispensing the marker when the activation of the trigger is received; and
storing the marker characteristic and time data when the activation of the trigger is received,
wherein a tag is associated with the marker, the tag storing the marker characteristic; and
wherein identifying the marker characteristic includes:
reading the marker characteristic from the tag.

33. The method of claim 32, wherein the tag is a radio frequency identification (RFID) tag.

34. The method of claim 32, wherein the marker characteristic comprises a type of the marker, a color of the marker, or a shape of the marker.

35. The method of claim 32, wherein identifying the marker characteristic includes:
presenting a number of possible marker characteristics on a user interface, and
receiving selection of one of the possible marker characteristics as the marker characteristic.

36. The method of claim 32, further comprising:
determining whether to permit the trigger to be activated based on the marker characteristic.

37. The method of claim 36, wherein the determination is based on a comparison of the marker characteristic to information from a ticket.

38. The method of claim 37, wherein the determination is based on a confirmation that the marker characteristic is correct.

39. The method of claim 32, further comprising:
increasing a count value when the activation of the trigger is received.

40. The method of claim 32, further comprising:
presenting information regarding the marker characteristic audibly or visually.

41. The system of claim 1, further comprising:
a communication system to send to an external device the at least one characteristic regarding the marker and the time data associated with the dispensing of the marker.

42. The marking tool of claim 16, further comprising:
a communication system to send to an external device the information and the time data associated with the dispensing of the marker by the marker dispenser.

43. The method of claim 32, further comprising:
sending the marker characteristic and the time data to an external device.

* * * * *

UNITED STATES PATENT AND TRADEMARK OFFICE

CERTIFICATE OF CORRECTION

PATENT NO. : 8,060,304 B2
APPLICATION NO. : 11/696606
DATED : November 15, 2011
INVENTOR(S) : Nielsen et al.

It is certified that error appears in the above-identified patent and that said Letters Patent is hereby corrected as shown below:

Please replace column 14, line 18 with the following corrected version:

-- 38. The method of claim 36 [[37]], wherein the determination is --

Signed and Sealed this
Twenty-eighth Day of February, 2012

David J. Kappos
*Director of the United States Patent and Trademark Office*